Aug. 8, 1933.  R. MATTHEWS  1,921,036
EGG TIMER
Filed May 18, 1931  2 Sheets-Sheet 1

INVENTOR
Robertson Matthews
BY
Evan and Fry
ATTORNEYS

Aug. 8, 1933.   R. MATTHEWS   1,921,036
EGG TIMER
Filed May 18, 1931   2 Sheets-Sheet 2
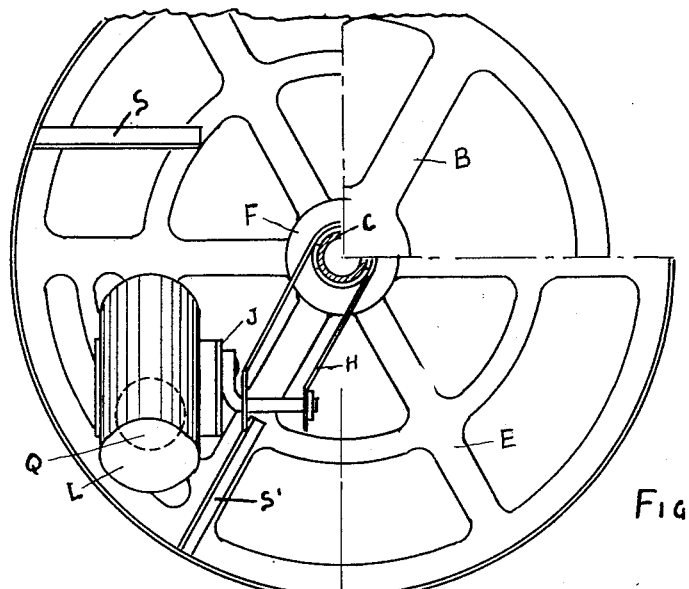
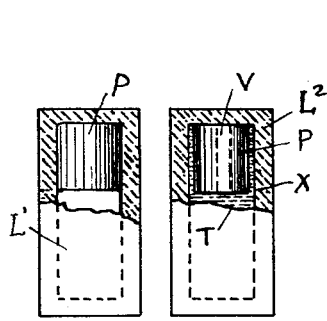
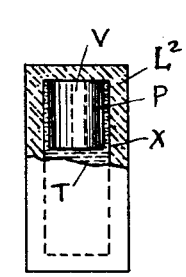
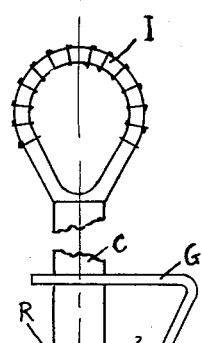
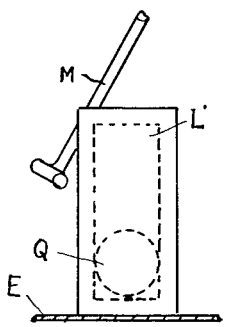
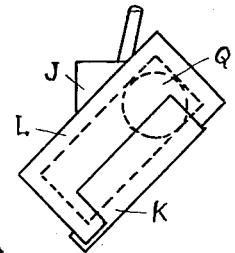
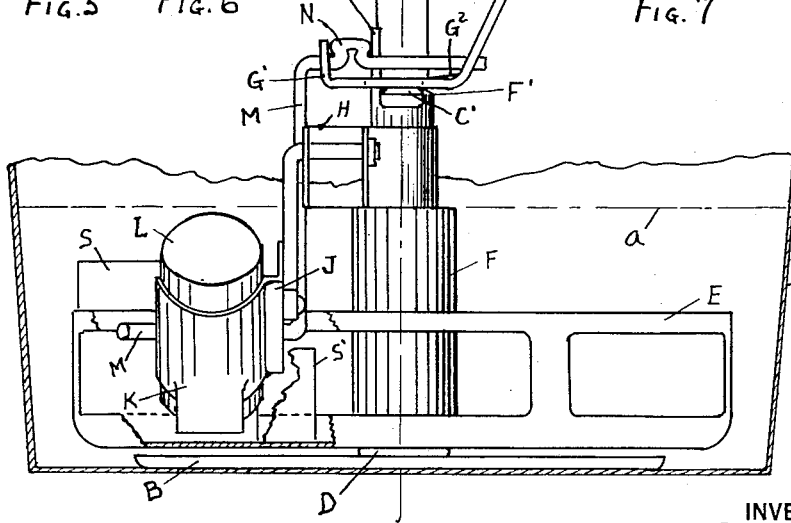
INVENTOR
Robertson Matthews
BY
Swan and Frye
ATTORNEYS Patented Aug. 8, 1933

1,921,036

UNITED STATES PATENT OFFICE 1,921,036

EGG TIMER

Robertson Matthews, Detroit, Mich.

Application May 18, 1931. Serial No. 538,131

6 Claims. (Cl. 53—1)

This invention relates to an egg-timing mechanism, and has for its object a relatively inexpensive and yet efficiently operating organization of parts by means of which the exposure of an egg to heated water for purposes of either soft boiling or hard boiling can be automically timed as regards the necessary duration thereof, without reliance upon a clock, hour glass, or any such fixed time-unit-measuring mechanism as takes no account of the initial temperature of the water or of the rapidity with which its temperature is being raised. Generally speaking, it involves the subjection to these thermal conditions of an automatic thermally-responsive member which when unactuated leaves the egg-supporting part of the mechanism unactuated and in the manually depressed position beneath the surface of the water to which it has been deliberately lowered, but which upon the attainment of the necessary temperature conditions functions as a tumbler or latch-tripping mechanism whose action results in the automatic lifting of the eggs out of the boiling water, so that they can be removed at leisure, but with the assurance that they have been cooked to just the degree desired.

In the drawings:

Figure 3 is a similar elevational view taken along the line 3—3 of Figure 2 and looking in the direction of the arrows there shown, the device being similarly in depressed position as regards the water level in the kettle.

Figure 4 is a plan view from above.

Figure 5 is a partly sectional elevational view of one form of tumbler or overweighting element used in connection with the tripping of the mechanism here employed.

Figure 6 is a similar view of a modified form.

Figure 7 is a fragmentary elevational view showing in phantom the overweighting action of a ball or similar rounded weight contained within the tripping cylinder which is of the same general contour as that shown in Figures 5 and 6.

Figure 8 is a view similar to Figure 7, but showing the overweighting ball restored to its non-tripping position at the top of the container, ready for the next heating or temperature raising phase.

Figure 1:
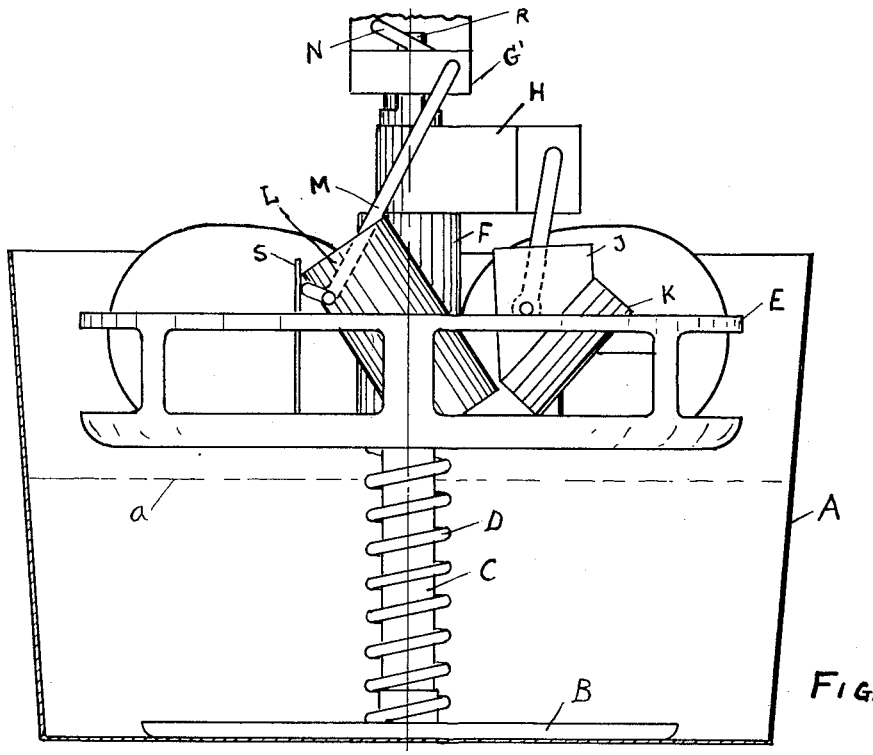
Figure 1 is a side elevational view of my improved device positioned within a kettle or similar fluid-holding vessel, the parts of my improved mechanism being shown in raised or elevated position relatively to the water level.

A indicates a kettle or similar vessel which is adapted to be exposed to the heating influence of a gas plate or similar heating source. Adapted to be rested upon the bottom of this vessel is the standard or base B of my removable improved egg-timing mechanism, from which rises the shaft or post C generally centrally of the side walls of the vessel A. A compression or helical spring D is interposed about the stem C between the base B and the under side of the egg-supporting basket E, preferably of wire or sheet metal. About the upper portion of the stem C, that is, the portion above the basket E, slidably engages a sleeve F, into whose lower portion the top end of the spring D extends, and upon whose upper end is supported the bracket H. A second bracket G which is of the overbent resilient form illustrated with particular clearness in Figures 3 and 4 slidably engages about the stem C, above the top of the sleeve F and below the limiting sleeve, which may be merely an extension or enlargement of the looped handle I at the top end of the stem C. This leaves the basket E and sleeve F, and their supported parts now to be described, free to move limitedly upward and downward along the shaft C, its downward movement being yieldingly opposed by the spring D, while, as just stated, its possible upward movement is fixedly limited by the presence above it of the extension from the handle I and beneath it the bracket G.

Pivotally supported from the lower one of the brackets H is a saddle or swinging plate J which supports the inclined trough piece or seat K within which is adapted to rest the tumbler cylinder L.

Referring for the moment for the details of this latter to anyone of the forms thereof shown in Figures 5 to 8 inclusive, it will be seen that each form consists essentially of a closed cylinder L, in which is movably located a weighted slug or ball, which, when the tumbler cylinder is unheated, is lodged in the upper end thereof as the latter lies inclined at an angle of substantially 45° from the horizontal when supported by the trough K. That the weight or the ball, as the case may be, does this, is due to the tight engagement of the inner wall L' of the tumbler cylinder about the cylindrical slug P or the ball Q. These cylinder walls may be plain, that is, all be a single thickness of metal, or they may be of a plurality of thicknesses, as illustrated sectionally in Figures 5, 6, 7 and 8, being separated in the latter case by a layer or packing of heat-resisting material, as L², the action of this latter being to prolong the time required for heat units which first attack the outside wall of the tumbler cylinder, to make their way to the interior wall so that it too will expand. As to either form it is of course obvious that the heat-induced expansion of the cylinder walls will take place before any appreciable quantity of heat has been further transferred to the slug P or ball Q within the cylinder; and the resultant diametrical expansion of the cylinder is such as to release the slug or ball which has hitherto been held by peripheral engagement of the walls of the cylinder about its surface, thus releasing either from its initial position at the upper end of the tumbler cylinder L, so that it falls or rather slides to the lower end thereof. This redistribution of the weight which is angularly supported by the trough K is sufficient to throw the entire saddle about its pivot to a degree that brings the hitherto obliquely positioned tumbler cylinder a substantially perpendicular position, and since there is no support, when it has attained this position, against its falling out from the trough K, it drops quite sharply forward and engages against the hooked lower end of the lock wire M, whose deformed upper end is pivotally supported by the bracket G.

My preferred embodiment of locking means for the parts when thus depressed comprises an annular groove or crosswise kerfing of the stem C as indicated at C', into which indentation the lip or apertured edge G² of the lower section G' of the bracket G resiliently fits. To facilitate this slight swinging or interlocking action of these parts, I preferably form the top edge of the sleeve F at a slight angle from the horizontal, as indicated at F' in Figure 3; as the bracket G is manually pressed downward along the stem C the lower lip G² of the bracket first encounters the top lip F' of the sleeve and from that point their engagement results in a slightly rocking movement of the bracket G, thus facilitating the interlocking of the lip of the lower bracket section G' with the kerf C'.

As brought out particularly in elevational Figure 3, the deformed portion N of this lock wire frictionally engages the resilient wire piece R, which is structurally a mere extension of the sleeve F, to a degree that when the several parts supported by the sleeve F are depressed they are held thus by the interaction of these parts, against the upwardly-pressing action of the spring D. When, however, the jolt-induced swing of the deformed locking wire M has resulted in the swing of its deformed part N in the manner described, the frictional engagement between it and the locking wire is terminated to a degree sufficient to allow the upward pressure of the spring D to predominate, thus lifting the entire basket B and its contents out of the now boiling water, whose level is indicated in Figures 1, 2, and 3 at a.

While the heat-induced release of the slug or ball within the tumbler cylinder is, according to my experience thus far, preferably effected through the medium of the expansion of the cylinder's walls in the manner described, an obvious modification thereof and equivalent therefor is shown in Figure 6, wherein the ends of the interior of the cylinder's surface are filled with wax or some heat-responsive substance, as indicated at T. As long as the cylinder is not subjected to heating influence, the adhesion of the end of the slug (or side of the ball) thereto is sufficient to hold it against a tendency to slip downwardly due to the oblique positioning of the tumbler cylinder when inoperative, but as soon as the latter has begun sufficiently, the partial liquefaction of the wax results in the release of the slug, so that it falls to the other end of the cylinder where it similarly rests upon a bed of wax, which as soon as it has cooled acts to hold the slug at that end of the cylinder, so that for the next use thereof as a heat-responsive tripping medium it is only necessary to reverse the position of the tumbler cylinder. At V in Figure 6 I have indicated the possibility of accelerating the flow of the melted wax past the sides of the slug P, by providing a longitudinally extending bore through its body, in addition to the generous clearance for this purpose about the sides of the slug which is indicated at X in said Figure 6.

Figure 2:
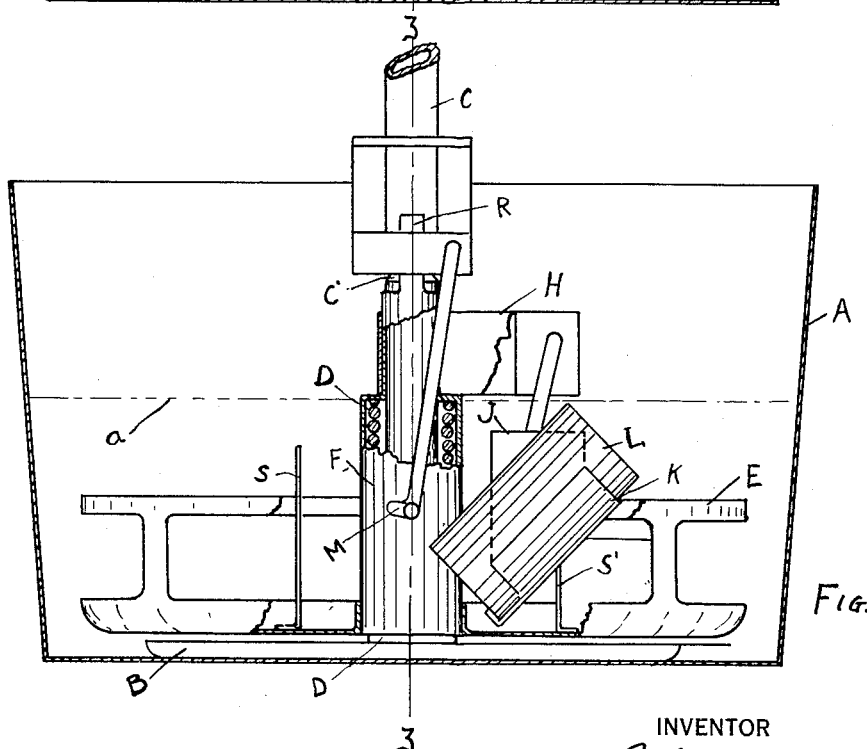
Figure 2 is an elevational view of my improved device in lowered or set position relatively to the water level.

In order to protect the eggs or other articles being cooked from possible breakage by the snapping outward movement of the wire trip piece M, I preferably position a vertical or radially extending shield S immediately behind it, as shown in Figures 2 and 4; a second shield S' may also be provided behind the trough support K, in order to adequately isolate these working parts from the egg-holding portion of the basket E.

What I claim is:

1. In combination with a supporting member, comprising a plurality of relatively movable members one of which is adapted to be rested upon the bottom of a fluid-containing vessel, resilient means for normally supporting one of said members in elevated position relatively to the other, latching means adapted to hold the spring-upheld one of said first named members in depressed position relatively to its companion member against the action of said resilient means, and a thermally responsive member comprising a plurality of relatively movable parts, supported in position of unstable equilibrium in actuative relation to said latch member and adapted to be overturned thereagainst by the attainment by one of such parts of a predetermined temperature and the resultant movement of the other of such parts relatively thereto.

2. In combination with a spring-resisted latch member whose selectively timed tripping is desired, a ball-containing cylinder supported in position of unstable equilibrium in potential operative relation thereto, the walls of said cylinder being adapted to respond to the action of changed thermal conditions to which it is subjected, thereby permitting relative movement of said ball within it and the resultant displacement of said cylinder to tripping engagement with said latch member.

3. In combination with a pivotally supported holding element, a thermally responsive member comprising a plurality of relatively movable parts supported thereby in initial relative position of unstable equilibrium, and a spring-resisted latch member positioned in operable relation with respect to said thermally responsive member and adapted to be actuated thereby upon the heat-induced fall of the latter thereagainst toward a position of more nearly stable equilibrium.

4. In combination with a rockable supporting element, a closed cylinder provided with a contained relatively movable body which is adapted to be released for relative movement within its cylinder upon the attainment by the latter of a predetermined temperature degree, said cylinder being supported by said first-named element in a position of nearly balanced equilibrium, such movement effecting the fall of said cylinder from its initial position toward a position of more nearly stable equilibrium.

5. In combination with a central column and a basket member movable thereupon, a spring for yieldingly pressing the basket to raised position relatively to said central column, a latch positioned on said column for holding said basket member in depressed position in opposition to the action of said spring, and a latch-tripping member normally located in spaced relation thereto and in a position of unstable equilibrium and adapted to be projected thereagainst by its fall toward a position of more nearly stable equilibrium resulting from its attainment of a predetermined thermal condition.

6. In an egg-timing mechanism, the combination, with a central supporting stem and a basket member movable therealong, of a spring for yieldingly forcing said basket member to raised position on said supporting stem, latching means carried by said stem for holding said basket member in lowered position thereon against the action of said spring, a normally inactive trip member whereby said latching means may be released from its described holding position, and a thermally responsive member supported in normal position of unstable equilibrium and in position of potential operative engagement with said trip member and adapted to be projected thereagainst upon its overthrow resulting from its attainment of a predetermined thermal condition.

ROBERTSON MATTHEWS.